United States Patent [19]
Woelki et al.

[11] Patent Number: 5,329,090
[45] Date of Patent: Jul. 12, 1994

[54] WRITING ON SILICON WAFERS

[75] Inventors: Michael Woelki, Stow, Mass.; James H. Scaroni, Somis, Calif.

[73] Assignee: A B Lasers, Inc., Acton, Mass.

[21] Appl. No.: 45,618

[22] Filed: Apr. 9, 1993

[51] Int. Cl.[5] .............................................. B23K 26/00
[52] U.S. Cl. ............................ 219/121.68; 219/121.78
[58] Field of Search ................... 219/121.68, 121.69, 219/121.8, 121.78; 346/108

[56] References Cited
U.S. PATENT DOCUMENTS 5,109,149  4/1992  Leung ............................... 219/121.69

*Primary Examiner*—C. L. Albritton

[57] ABSTRACT

Surfaces of silicon wafers used in making computer chips are marked by dimples engraved by pulses of radiation from a Nd:YAG or Nd:YLF laser pumped by diode lasers (commonly called a DPY laser). A beam of radiation from the DPY laser is focused on and moved across the surface of a wafer so as to produce dimples in a cluster positioned on a microgrid subdividing elements of a dot-matrix representation of a text written in alpha-numeric or bar-code characters.

8 Claims, 5 Drawing Sheets

WRITING ON SILICON WAFERS

BRIEF SUMMARY OF THE INVENTION

This invention relates to producing readable marking on silicon wafers used in making computer chips. Such marking is used to permanently identify and serially number wafers during manufacturing.

Beams generated by arclamp-pumped neodymium yttrium aluminum garnet (Nd:YAG) lasers have been used to produce markings on silicon wafer surfaces. Output from such systems, however, is difficult to maintain at constant level because of the progressive degradation of the arclamp. These systems can be a source of airborne particles which contaminate the wafer surfaces. The Nd:YAG laser marking systems are also quite large, occupying valuable floor space in the clean rooms in which they operate. Furthermore they are water cooled and require 220 v electrical service, thus making utility requirements more complex. The arclamps and cooling systems also require frequent maintenance, which is a serious operational problem in clean rooms.

In the present invention a diode pumped laser is used as a pulsed radiation source. In order to realize a level of energy concentration to effectively perturb the surface of a silicon wafer an optical system is used to focus a beam from the laser into a small spot, and because a single isolated spot this small is difficult to read, a cluster of such spots is placed on a surface of a wafer in a microgrid within a larger grid defining characters to be written on the wafer.

DETAILED DESCRIPTION

Figure 1:
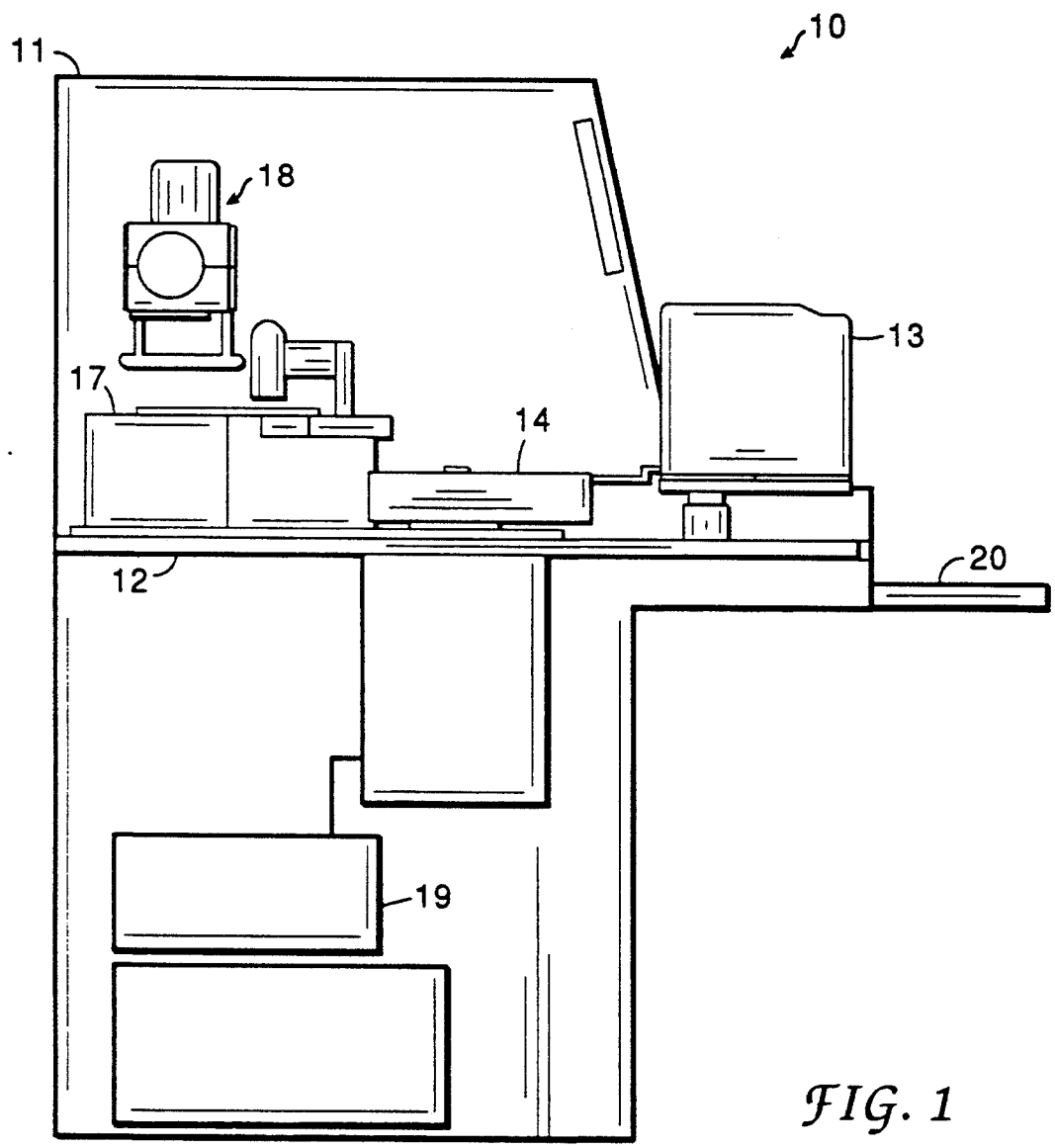
FIG. 1 shows apparatus for making readable marking on silicon wafers according to the invention.
Figure 2:
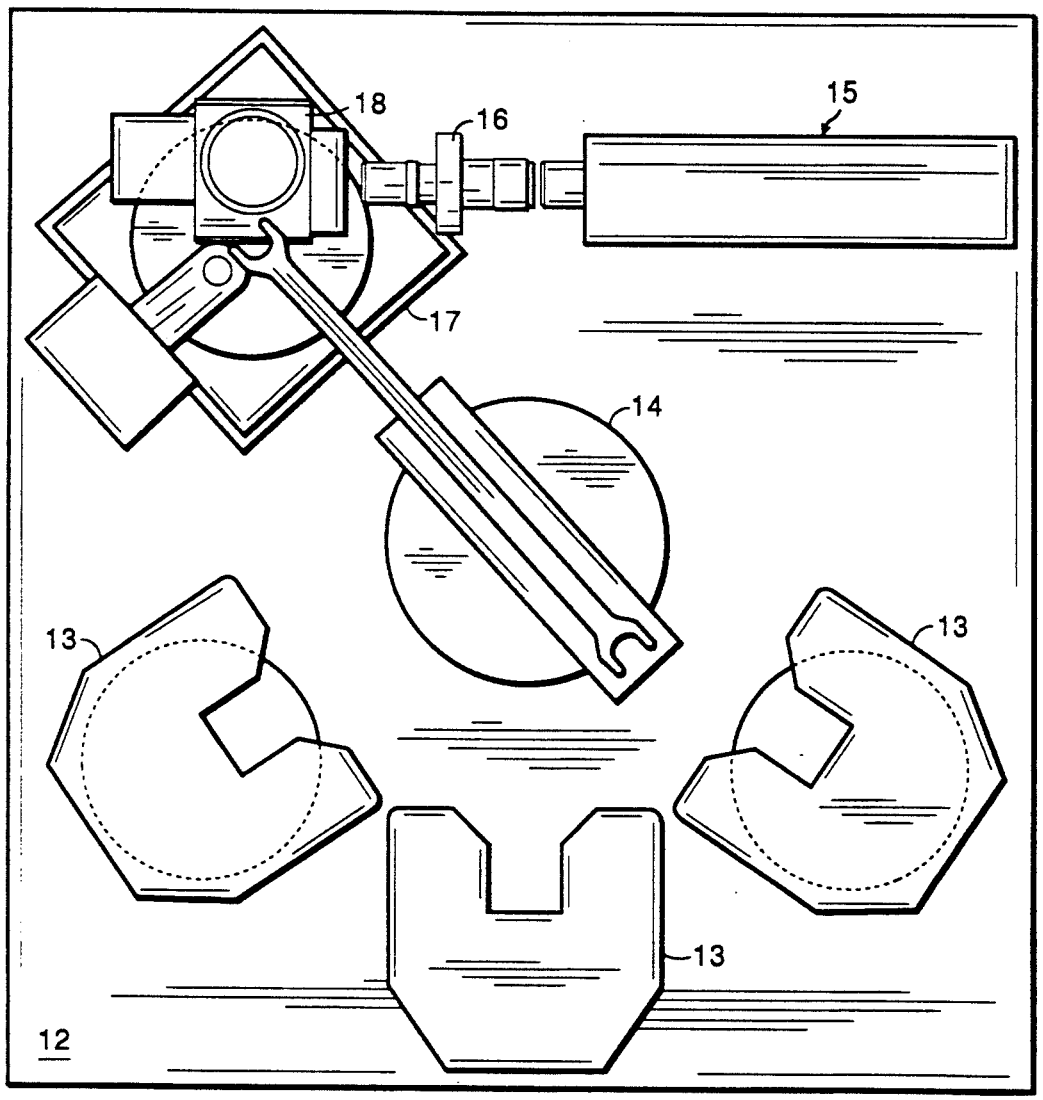
FIG. 2 shows the arrangement components on an operating deck of the apparatus of FIG. 1.

Apparatus 10 for making readable marking on silicon wafers, according to the invention is housed in console 11. As shown particularly in FIGS. 1 and 2, deck 12 supports wafer cassettes 13, wafer manipulator 14, marking radiation source 15, telescopes 16 and 43, work table 17, and beam mover 18. Controller 19 is mounted within the lower part of console 11; keyboard 20 extends out from console 11; and display 40 is mounted on the front of console 11. Construction and operation of the wafer cassettes and wafer manipulator are conventional and well understood by those skilled in the wafer marking art and need not be further described.

Figure 3:
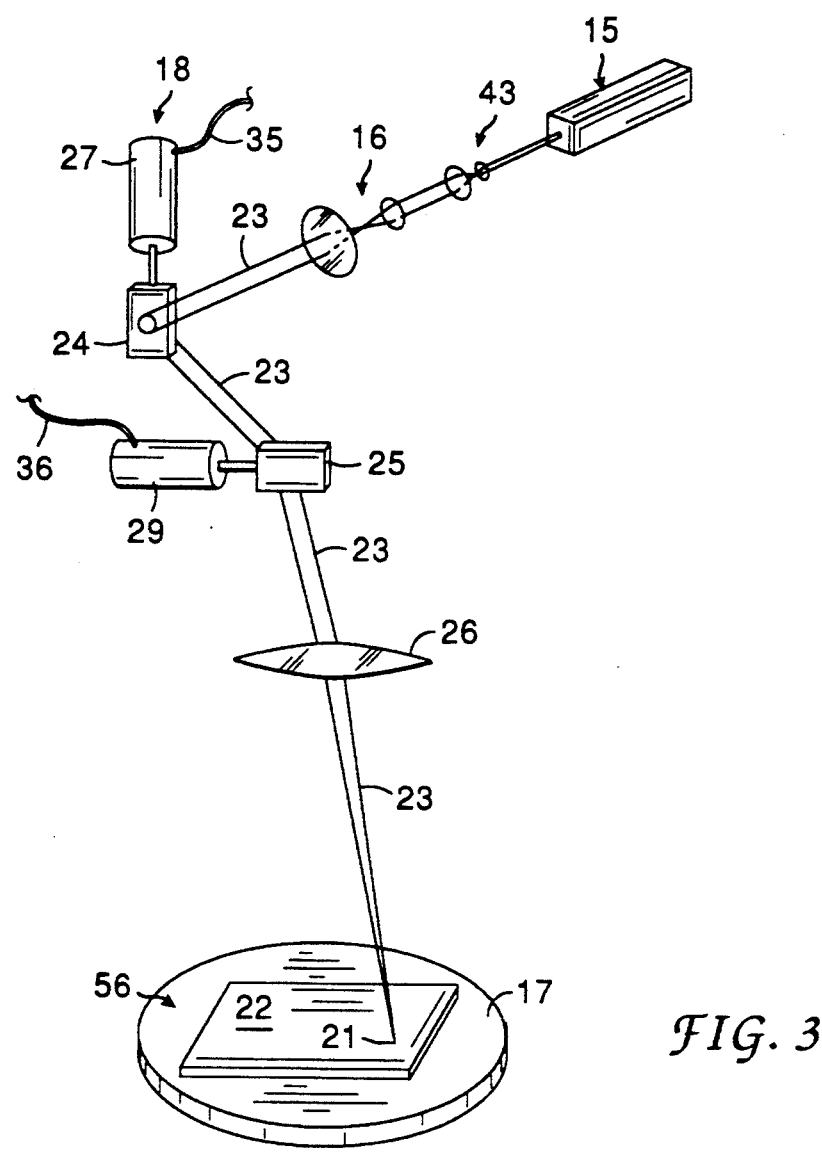
FIG. 3 shows optical elements and an optical path in the apparatus of FIG. 1.

As shown more particularly in FIG. 3, optical elements including beam-expanding telescopes 16 and 43, mirrors 24 and 25, and flat-field focusing lens 26 define optical beam path 23 for radiation from source 15 to focus point 21 at surface of silicon wafer 22 positioned in a writing position on work table 17. Telescopes 16 and 43 expand beam 23 to a diameter of 2 mm. Beam mover 18 operates first deflecting mirror 24, mounted on the vertically oriented shaft of first galvanometer 27, and second deflecting mirror 25 mounted on the horizontally oriented shaft of second galvanometer 29. Galvanometer 27 is connected to controller 19 through communication channel 35 and galvanometer 29 is connected to controller 19 through communication channel 36. Rotation of mirrors 24,25 changes the final direction of beam 23 and the position of focus point 21 on the surface of silicon wafer 22. Beam mover 18 using rotating deflection mirrors is conventional and well known to those skilled in the wafer marking art. Flat field lens 26 has a focal length of 100 mm and brings beam 23 to a focus on the surface of wafer 22 irrespective of deflections introduced by mirrors 24 and 25.

Figure 4:
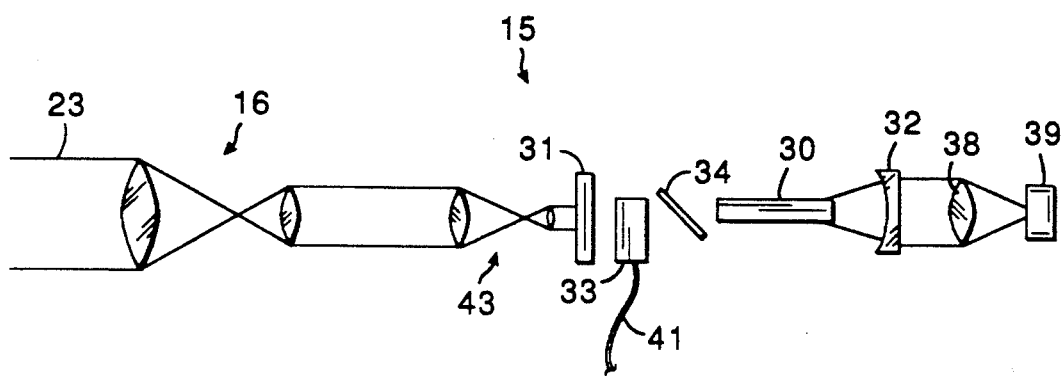
FIG. 4 shows a marking radiation source and optical elements used in the apparatus of FIG. 1.

Construction of radiation source 15 is shown particularly in FIG. 4. A marking laser rod 30 made of Nd doped YAG crystal is positioned between cavity mirror 31 and cavity mirror 32. Laser rod 30 may alternatively be made of Nd doped YLF crystal. Mirror 32 is dichroic, transmitting at wavelength of 800 nm and reflecting at wavelength 1047 nm. Q-switch 33 and polarizer 34 are also positioned between cavity mirrors 31, 32. Q-switch 33 is connected to controller 19 through communication channel 41. Diode laser 37 emits radiation of about 800 nm, which is directed into YAG crystal 30 by lens 38 through dichroic mirror 32 which is effective in pumping laser rod 30. Radiation source 15 is advantageously adjusted to emit pulses of radiation at a wavelength of 1047 nm and duration over 40 ns.

Figure 5:
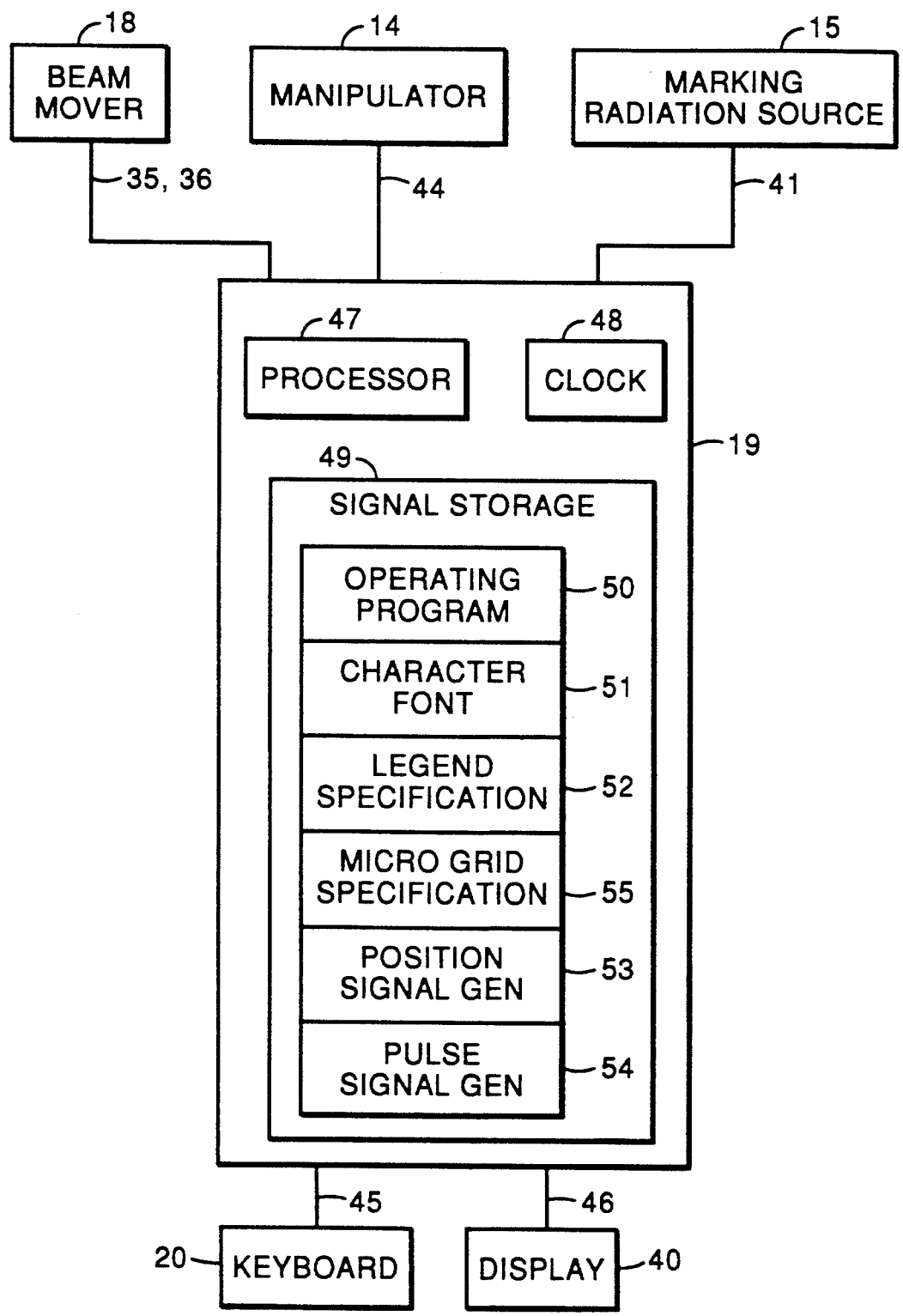
FIG. 5 shows diagrammatically a controller and connections thereto used in the apparatus of FIG. 1.

As shown particularly in FIG. 5, controller 19 is connected to beam mover 18 through signal channels 35, 36, to manipulator 14 through signal channel 44, to radiation source 15 through signal channel 41, to keyboard 20 through signal channel 45, and to display 40 through signal channel 46. Controller 19 includes processor 47, clock 48, and signal storage 49. Signal storage 49 includes modules for operating program 50 for processor 47, character font 51, which stores signals specifying on a macrogrid a dot matrix form for an alphabet of characters, a module 52 for storing a legend to be written on a wafer, and a module 53 for generating position signals, a module 54 for generating pulse signals, and a module 55 specifying a cluster 58.

The operation of the marking apparatus is as follows. An operator introduces a stack of unmarked wafers into one of the cassettes, and through the keyboard enters specifications for their marking. These specifications will include the sequence of characters to be marked on the wafers, and may also specify size, incrementing serial numbers, and other properties of the marking. With reference to the signals stored in the font the controller processes the input from the keyboard to construct and store a specification or map of the legend to be marked on the wafers. This specification defines elements 61 of a grid 60 (called the macrogrid herein) wherein marks are to be placed to render the legend on the wafer. The construction of the legend specification is used in dot matrix printers and displays and techniques for doing it are well known.

After the input of marking specifications as described above, the controller controls the marking operation. It sends control signals on signal channel 44 to cause manipulator 14 to move a wafer from a cassette to a precisely defined writing position 56. The construction and control of manipulators to do this are well known in the wafer marking art and need no further explication. The controller then generates and applies control signals through signal channels 35, 36 to cause beam mover 18 to move focus point 21 along a route over the surface of silicon wafer 22 in writing position 56. At the same time the controller generates and applies to communication channel 41 of signals which cause laser 30 to emit pulses of radiation. The route of the focus point and timing of the pulse initiating signals are coordinated by the controller to produce a pattern of spots in clusters on the wafer which are readily readable as the desired legend, as discussed further below. After the writing on the wafer has been completed the controller sends signals to the manipulator to move the written wafer to a cassette. The operation continues with positioning and marking of another wafer.

The radiation from the laser has a wavelength of 1047 nm, and when brought to a focus by lens 26 on the surface of wafer 22 it produces a highly focused illuminated area. The silicon in this focused illuminated area is heated by a pulse from the radiation source 15 above the melting point but below the vaporation temperature, and it subsequently resolidifies to form a dimple of diameter about 25 um on the surface of the wafer, the dimple being centered on the position of the focus point at the time the pulse was emitted. Such dimples are not individually easily seen, but by positioning such dimples in cluster patterns they produce easily readable marking on a silicon wafer.

Clusters are defined by specifications stored in microgrid specification 55 with reference to a microgrid 59 which subdivides an element of the macrogrid 60, the specification designating a subset of the microgrid elements 62 which will be marked. Clusters and microgrid are advantageously defined so that dimples placed on adjacent elements of the microgrid nearly touch each other and with the subset of marked elements constituting less than half of the elements of the microgrid. In particular a cluster of nine dimples in a 3×3 square array on a microgrid of 5×5 elements may be used.

Figure 6:
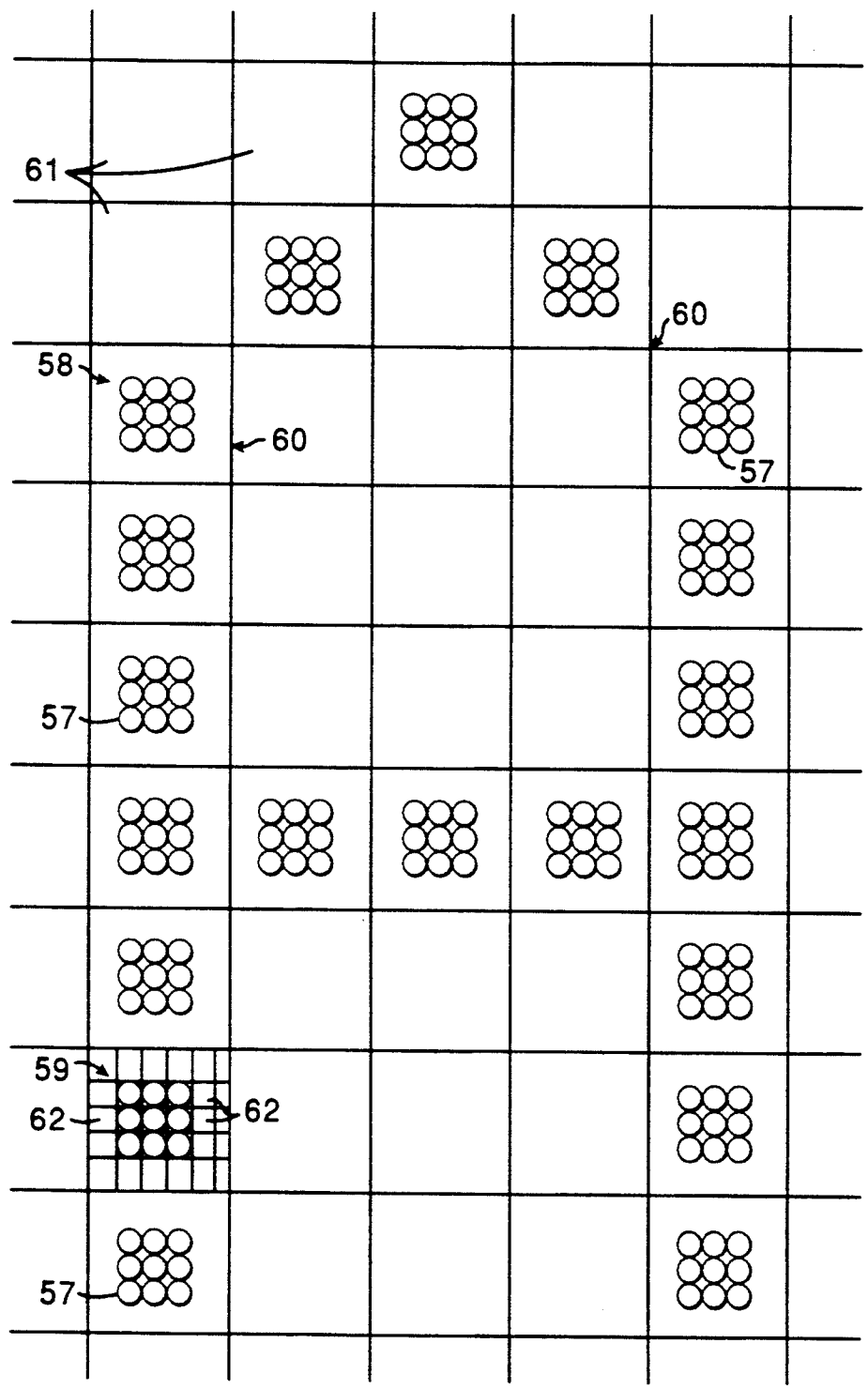
FIG. 6 shows a character as embossed on a wafer by the apparatus of FIG. 1.

As an example, the positioning of dimples 57 to form a letter "A" is shown in FIG. 6. The dimples 57 are arranged in clusters 58. Each cluster consists of nine dimples arranged in a 3 by 3 square on one of microgrids 59. Each of microgrids 59 fits within and subdivides an element of macrogrid 60. The clusters are positioned in those elements of the macrogrid which are defined by a dot matrix representation of the letter "A".

The controller generates signals controlling the route of the focus point and the coordinated pulse signals by first constructing a map of the macrogrid elements which are to be marked referring to the stored legend specification and the character specifications stored in the font. This operation is conventional and used in dot matrix printing and displays. The controller then causes the focus point to make a plurality of horizontal traverses through the top row of the macrogrid elements, the successive traverses being displaced from the center of the macrogrid in accordance with the specification of the cluster pattern stored in the microgrid specification. The controller emits the pulse controlling signals when the focus point is at points displaced from the macrogrid element center also in accordance with the specification of the cluster pattern stored in the microgrid specification, the pulse signals being emitted only when the focus point is situated in macrogrid elements indicated by the map for marking. After making the three traverses through the top row of the macrogrid, the controller causes the route of the focus point to make three passes through the second row while again using the specification of the font and of the cluster pattern to initiate laser pulses and so continues to pass over and the dimples of the legend.

We claim:

1. Apparatus for making readable marking on silicon wafers comprising
   a manipulator for moving a silicon wafer to a writing position,
   a marking radiation source,
   optical elements defining an optical beam path for radiation from said marking radiation source to a focus point at a surface of a silicon wafer positioned in said writing position,
   a beam mover, and
   a controller,
   said marking radiation source including a Nd:YAG laser, a diode laser effective in energizing said Nd:YAG laser, and an optical switch responding to pulse control signals from said controller to initiate an output pulse of radiation from said marking laser,
   said beam mover being effective in response to position control signals from said controller to move said focus point over said surface of a silicon wafer positioned in said writing position,
   said controller including
      a stored font storing therein specification of elements of a macrogrid defining each character of an alphabet,
      an input device for receiving signals defining a legend to be written on a wafer,
      means for combining said signals defining a legend and signals from said stored font to define elements of a macrogrid representing said legend,
      stored signals specifying on a microgrid a plurality of elements defining a cluster, said microgrid subdividing elements of said macrogrid,
      means for generating and applying to said beam mover position control signals that move said focus point along a route passing through every said specified microgrid element of every said specified macrogrid element of said legend and for generating and applying to said marking radiation source pulse control signals coordinated with said position control signals to initiate an output pulse of radiation while said focus point is in each said specified microgrid element of every said specified macrogrid element of said legend.

2. Apparatus as claimed in claim 1, wherein said elements of the microgrid defining a cluster are arranged in a 3 by 3 square pattern.

3. Apparatus as claimed in claim 1, wherein said elements of the microgrid defining a cluster occupy less than half of the area of a macrogrid element.

4. Apparatus as claimed in claim 1, wherein the duration of the output pulse of said laser is longer than 40 ns.

5. Apparatus for making readable marking on silicon wafers comprising
   a manipulator for moving a silicon wafer to a writing position,
   a marking radiation source,
   optical elements defining an optical beam path for radiation from said marking radiation source to a focus point at a surface of a silicon wafer positioned in said writing position,
   a beam mover, and
   a controller, said marking radiation source including a Nd:YLF laser, a diode laser effective in energizing said Nd:YLF laser, and an optical switch responding to pulse control signals from said controller to initiate an output pulse of radiation from said marking laser, said beam mover being effective in response to position control signals from said controller to move said focus point over said surface of a silicon wafer positioned in said writing position, said controller including a stored font storing therein specification of elements of a macrogrid defining each character of an alphabet, an input device for receiving signals defining a legend to be written on a wafer, means for combining said signals defining a legend and signals from said stored font to define elements of a macrogrid representing said legend, stored signals specifying on a microgrid a plurality of elements defining a cluster, said microgrid subdividing elements of said macrogrid, means for generating and applying to said beam mover position control signals that move said focus point along a route passing through every said specified microgrid element of every said specified macrogrid element of said legend and for generating and applying to said marking radiation source pulse control signals coordinated with said position control signals to initiate an output pulse of radiation while said focus point is in each said specified microgrid element of every said specified macrogrid element of said legend.

6. Apparatus as claimed in claim 5, wherein said elements of the microgrid defining a cluster are arranged in a 3 by 3 square pattern.

7. Apparatus as claimed in claim 5, wherein said elements of the microgrid defining a cluster occupy less than half of the area of a macrogrid element.

8. Apparatus as claimed in claim 5, wherein the duration of the output pulse of said laser is longer than 40 ns.

* * * * *